United States Patent [19]

Sule

[11] Patent Number: 4,896,753
[45] Date of Patent: Jan. 30, 1990

[54] BICYCLE BRAKE

[76] Inventor: Sandor Sule, Huttenlebenweg 42, CH-8240 Thayngen, Fed. Rep. of Germany

[21] Appl. No.: 175,531

[22] Filed: Mar. 31, 1988

[30] Foreign Application Priority Data

Apr. 4, 1987 [DE] Fed. Rep. of Germany ....... 3711477
Apr. 15, 1987 [DE] Fed. Rep. of Germany ....... 3712734

[51] Int. Cl.[4] ............................................. B60T 11/16
[52] U.S. Cl. ..................................... 188/344; 92/40; 92/44; 92/94; 92/101; 188/24.19
[58] Field of Search .................. 188/344, 24.19, 24.22, 188/26; 60/533; 92/36, 40, 44, 90, 94, 101

[56] References Cited

U.S. PATENT DOCUMENTS

| | | | |
|---|---|---|---|
| 2,170,574 | 8/1939 | Sauzedde | 92/101 X |
| 2,178,490 | 10/1939 | Nielsen, Jr. | 92/94 X |
| 2,197,012 | 4/1940 | Sauzedde | 92/129 X |
| 4,343,380 | 8/1982 | Kawaguchi | 188/344 X |
| 4,360,082 | 11/1982 | Haraikawa et al. | 188/344 X |
| 4,391,353 | 7/1983 | Mathauser | 188/344 X |
| 4,632,225 | 12/1986 | Mathauser | 188/344 X |
| 4,665,803 | 5/1987 | Mathauser | 188/344 X |

FOREIGN PATENT DOCUMENTS

| | | | |
|---|---|---|---|
| 3216885 | 11/1983 | Fed. Rep. of Germany | 60/533 |
| 1081770 | 6/1954 | France | 92/90 |
| 581556 | 11/1976 | Switzerland . | |
| 800196 | 8/1958 | United Kingdom | 188/344 |
| 1401152 | 7/1975 | United Kingdom | 188/344 |
| 1405676 | 9/1975 | United Kingdom | 188/344 |
| 2088976 | 6/1982 | United Kingdom | 188/24.19 |

*Primary Examiner*—George E. A. Halvosa
*Attorney, Agent, or Firm*—Bachman & LaPointe

[57] ABSTRACT

A bicycle brake system with at least one master cylinder that is connected to a hand lever, and at least one wheel cylinder that is connected thereto by a hydraulic brake line is to be improved in that a hollow body (38) that is of elastic material and closed at one end is installed in a master cylinder (12); in that interior space (39) accommodates a pushrod (44) that is adjacent to the hand lever (13) and its closed face end (37) rests against a piston (34) that is supported against the accumulator within the reducible pressure chamber (30) of the master cylinder.

14 Claims, 5 Drawing Sheets

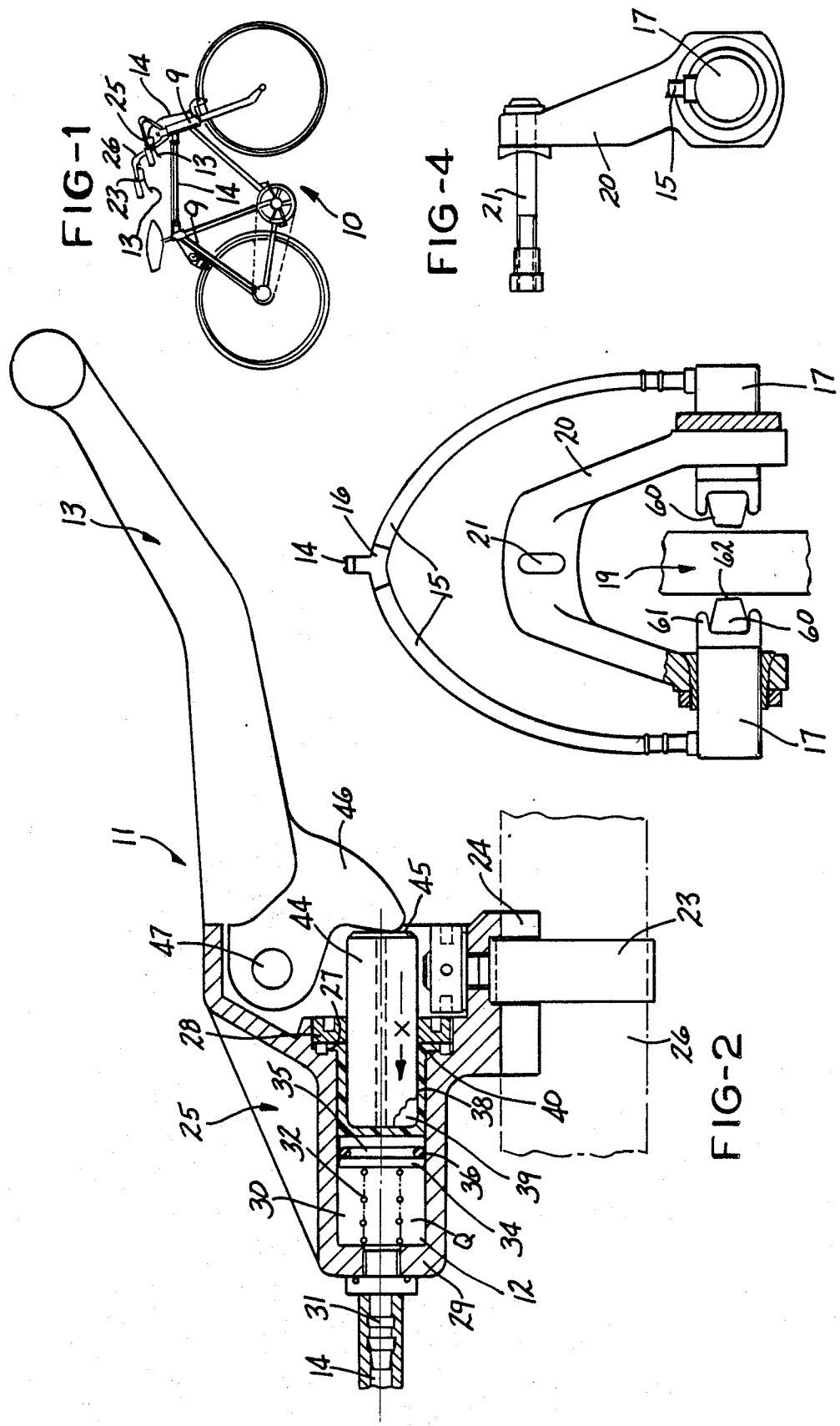

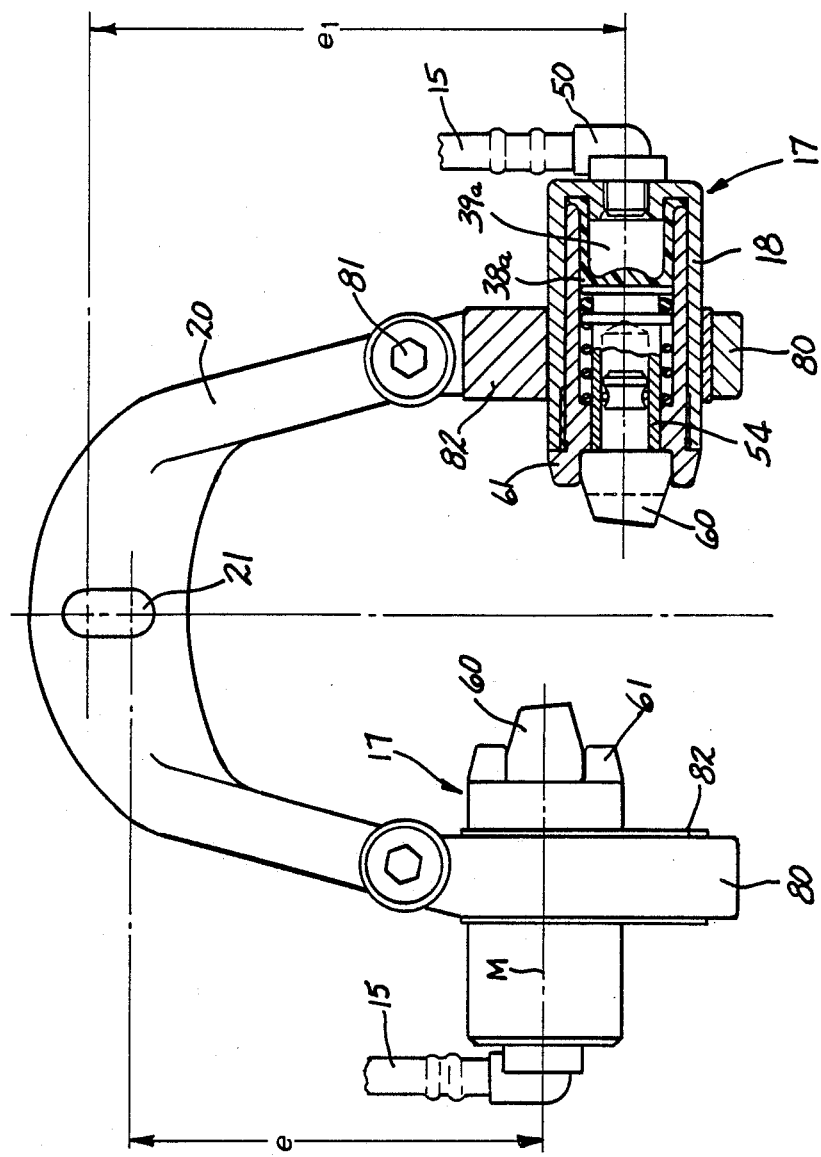

BICYCLE BRAKE

BACKGROUND OF THE INVENTION

The present invention relates to a bicycle brake system with at least one master cylinder that is connected to a hand lever, and at least one wheel cylinder that is connected thereto by a hydraulic brake line, said brake line opening out at both ends into a space of variable volume, it being possible to reduce the volume of the space within the master cylinder by means of an organ operated by a hand lever against an accumulator.

A bicycle brake of this kind is known from Swiss Patent 581 556; this has two opposing wheel cylinders that act on both sides of the wheel. The brake pads are operated by the pressure of the fluid in the pressurized-fluid system against the return force of a spring or the like, the pressurized-fluid system being activated against the master cylinder.

In view of this prior art, it is the aim of the present invention to improve a bicycle brake system of this kind and ensure total freedom from leaks. In addition, the brake system is to be of simple construction and require only a few component parts.

SUMMARY OF THE INVENTION

According to the present invention, in order to solve this task, a hollow body of elastic material, closed at one end, is so secured in its open area, within the master cylinder, that its internal space accommodates a pushrod that abuts against the hand lever, and its closed face end lies against a piston that is supported by the accumulator. The interior space of the wheel cylinder is fitted with a preferably like-shaped elastic hollow body, and the brake line opens out into the interior space within said hollow body; thus the interior space is acted upon by the fluid, and as the pressure of said fluid increases it forces the brake pads against the opposite surface on the wheel with its closed face end.

Here, it has been made possible that with a single element, the problem of fluid sealing in a hydraulic bicycle brake has been solved in an extremely simple manner. In the master cylinder, the interior space of the hollow body is not a part of the fluid system, but is a receiving organ for the pushrod that can be moved axially by the hand lever. Within the master cylinder, the brake fluid flows within the master cylinder, outside the hollow body, into a cylinder space that contains the spring for returning the elastic hollow body into the starting position.

In the wheel cylinder, the interior space of the hollow body, which is in the form of a cap, is once again part of the fluid system and the return spring lies outside the fluid system and preferably encloses a mounting shaft for the brake pads.

Additional features of the present invention are set out herein.

Thanks to this system, it is now possible to effect precise braking processes without failures. The brake system according to the present invention is cost effective, easy to maintain, and can be retrofitted to any kind of bicycle, whether fitted with an auxiliary engine or not.

Of independent inventive significance is the configuration of a disk brake wherein the hollow body of a wheel cylinder is associated with a brake pad of a disk brake, said brake pad acting at right angles to the plane of the disk, close to the edge of said disk. The brake pad is part of a floating pair of brake pads between which the brake disk passes. The wheel cylinder is attached to an arm-like holder and this is connected rigidly to an axle pin.

In addition, it is within the scope of the present invention that a slip coupling be provided between the wheel hub and the brake disk, this preventing lockup during the braking process.

BRIEF DESCRIPTION OF THE DRAWINGS

Further advantages, features, and details of the present invention are set out in the following description of a preferred embodiment that is described below in greater detail on the basis of the drawings appended hereto. These drawings show the following:

FIG. 1: A side view of a bicycle with the bicycle brake;

FIG. 2: Enlarged view of the master cylinder and the thimble insert of the bicycle brake in partial longitudinal cross-section;

FIG. 3: An arrangement of the wheel cylinders of the bicycle, partly sectioned;

FIG. 4: A side view of FIG. 3;

FIG. 8: A detail of an embodiment of the arrangement of the wheel cylinders of the bicycle shown as in FIG. 3;

Figure 6:
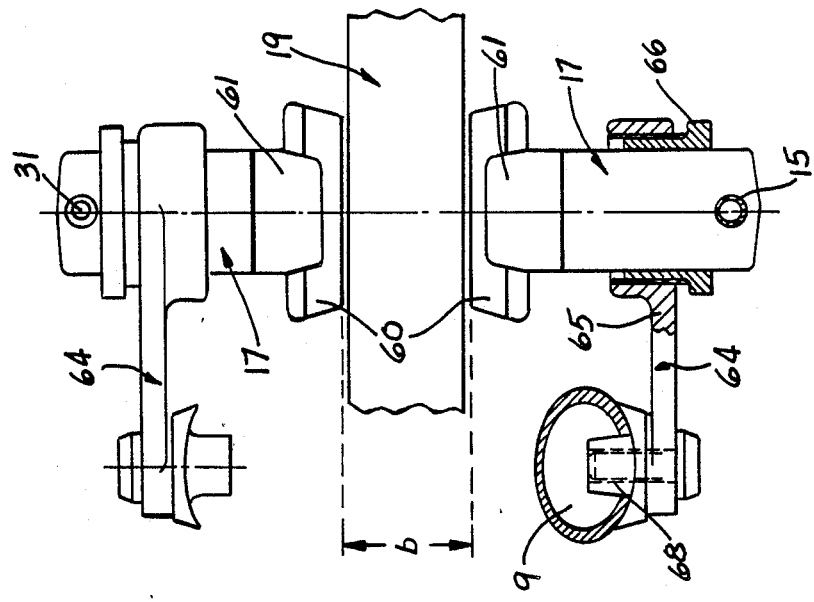
FIG. 6: A plan view of another embodiment of two wheel cylinders on a vehicle tire.

A bicycle brake 11 for a bicycle shown in FIG. 1 consists of a master cylinder 12 with a hand lever 13, a brake line that runs from the master cylinder 12, and a pair of wheel cylinders 17 on both sides of a wheel, indicated only in a simplified form at 19, in a bicycle which, for reasons of simplicity, is not shown in greater detail.

The wheel cylinders 17 are attached to a part of the forks 9 or the like at 21, by means of a caliper-like holder 20, and are connected by curved sections 15 of brake line and a T-piece 16 to the brake line 14. The master cylinder is mounted through a mounting clamp 23 and a cylinder housing adapter 24 on the handlebars at the point numbered 26.

The master cylinder 12 has a cylindrical pressure chamber 30; within this chamber a coil spring 32 rests at one end against a rear wall 29 of the chamber; at its other end, said spring 32 touches a disk piston 34. An annular groove 35 in the piston 34 accommodates an O-ring 36; at its end that is remote from the coil spring 32, the piston fits snugly against a plastic thimble 38 that is of elastic material. This thimble insert 38 is secured by a flange-like radial collar 40, between an annular shoulder 27 of the cylinder housing 25 and a clamping ring 28.

Figure 5:
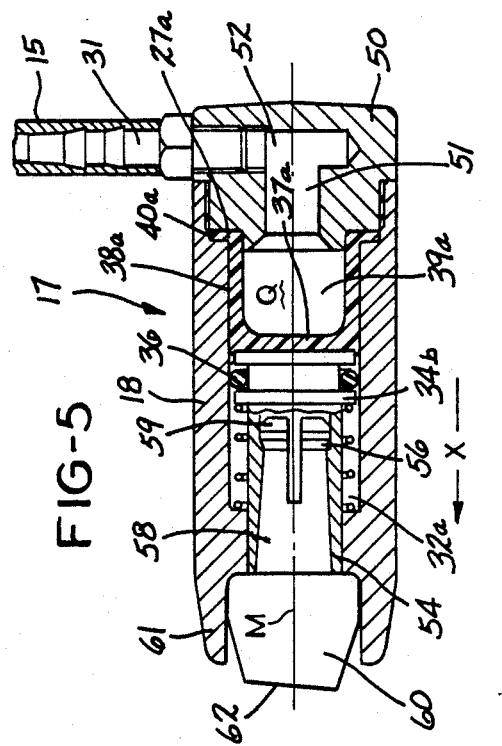
FIG. 5: The wheel cylinder of FIG. 3 in enlarged longitudinal cross-section.
Figure 7:
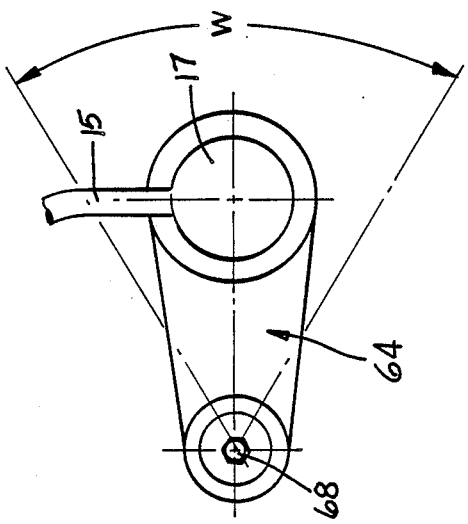
FIG. 7: A side view of FIG. 6.

Within the interior space 39 of the elastic plastic thimble 38 there is a pushrod 44; a cam 46 that is an integral part of the hand lever 13, which is mounted on mounting means 47 so as to be able to pivot, abuts against the face end 45 of this pushrod 44. When the hand lever 13 is operated, the pushrod 44 and with it the disk piston 34 and the brake fluid Q in the pressure chamber 30 is moved into the brake line 14 without any leakage because of the plastic thimble 38. As is shown in FIG. 5, the wheel cylinder 17 within the housing 18 is also fitted with a plastic thimble 38a, and the radial collar 40a of this thimble lies against an annular shoulder 27a of the housing 18, where it is held in position by means of a screw nipple 50. This nipple connects the sealed inner chamber 39a of the plastic thimble 38a to a brake line connector 31 for the line 15, through an angled drilling 51,52.

It can be seen that here, the brake fluid Q presses the disk piston 34b against a hollow piston rod 54 when the master cylinder 12 is operated. This piston rod is configured with an inside conical surface and an annular shoulder 56 as a receiving sleeve for a slotted conical pin 58 with a radial, shoulder-like projecting clamp end 59. The conical pin 58 is the inserted portion of a brake shoe 60 which, because of the barbed-like pairing of the clamps 56/59, is installed so as to be replaceable.

The bridge-like brake shoe 60 shown in FIG. 6 is overlapped on both sides by side pieces 61 of the housing 18, and is provided with a braking surface 62 that is inclined relative to the longitudinal axis M of the cylinder.

In FIG. 6, two brake shoes 60 are located opposite each other with their braking surfaces 62 separated by an average distance b; they are secured in cylindrical holders 64 by a threaded sleeve 66 such that the interval between them can be altered. In this embodiment, a cross-arm 65 of the cylinder holder 64 ends at one side surface of the fork 9, shown here in cross section, to which the cylinder holder 64 is secured at 68.

This configuration makes it possible to pivot the cylinder holder 64 through an angle w of approximately 60° and then resecure it, which makes it much simpler to adjust the wheel cylinder 17.

Because of the design shown in FIG. 8 the wheel cylinders 17 on the wheel 19 can be adjusted, without any problem, by at least 50 mm and by a maximum of 70 mm (dimensions e, $e_1$). Each is mounted in an eccentric disk 82 that is installed so as to be rotatably adjustable in bearings 80 on the holder 20; the position of this eccentric disk can be fixed by operating a lock 81.

As has been discussed, the whole of the brake system described above is leak-free since the brake fluid even in the wheel cylinders cannot escape. It fills the interior space 39a of the plastic thimble 38a, the face surface 37a of which is forced in the direction x by the brake fluid Q. When this occurs, as is shown in FIG. 5, the disk piston 34b moves to the left and forces the brake shoe 60 out. When the pressure of the brake fluid drops, the brake shoe 60 is then retracted by the coil spring 32a in the same manner as the disk piston 34 of the bicycle brake 11 in FIG. 2.

Figure 10:
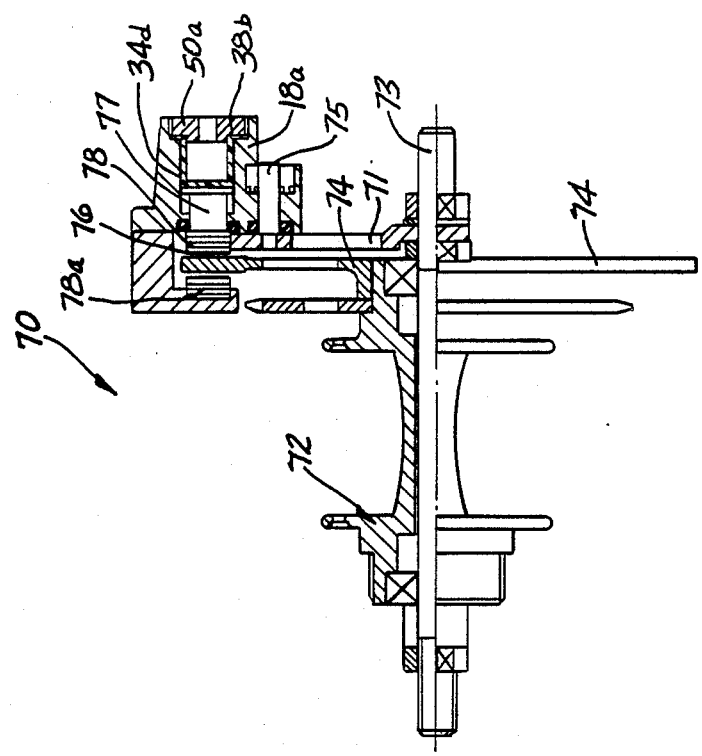
FIGS. 10 and 12: Partially sectioned side views of figures 9 and 11, respectively.
Figure 9:
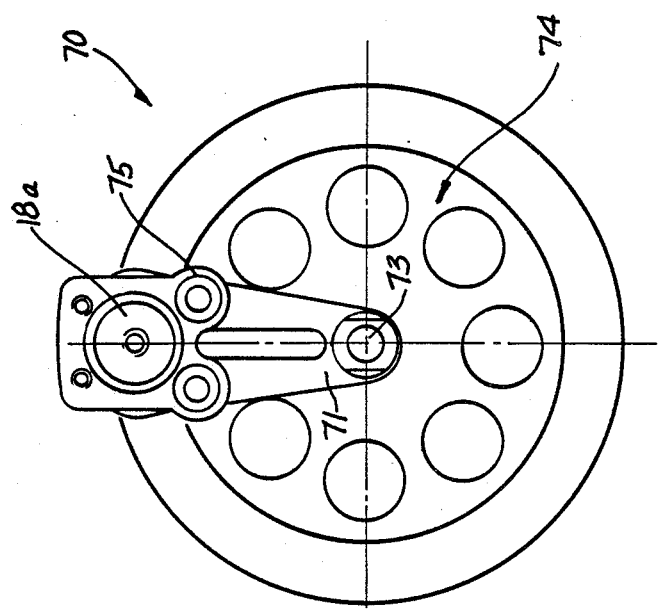
FIGS. 9 and 11: Front views of other embodiments of a disk brake of a bicycle brake.

The leak-free system that has been described can, of course, be used for a brake disk 70 arranged as shown in FIGS. 9 and 10 on the hub 72 of a wheel axle 73. The brake disk 74 passes through a gap 76 between the above described movable brake pad 78 and a coaxially opposite fixed brake pad 78a. The movable brake pad 78 is in this instance connected to an axial pin 77 of the disk piston 34d that protrudes from the housing 18a. The latter encloses a plastic thimble 38b in the manner already described, and this thimble 38b is held in position by a screw 50a to which the brake line 14, 15 is connected.

What is involved here is a so-called floating saddle brake 78, 78a; during the braking process the coaxial brake pads 78, 78a are drawn together in the manner of a caliper and thus restrain the brake disk 74. The housing 18a is secured by means of a holding arm 71, and a bolt mounting 75.

Figure 11:
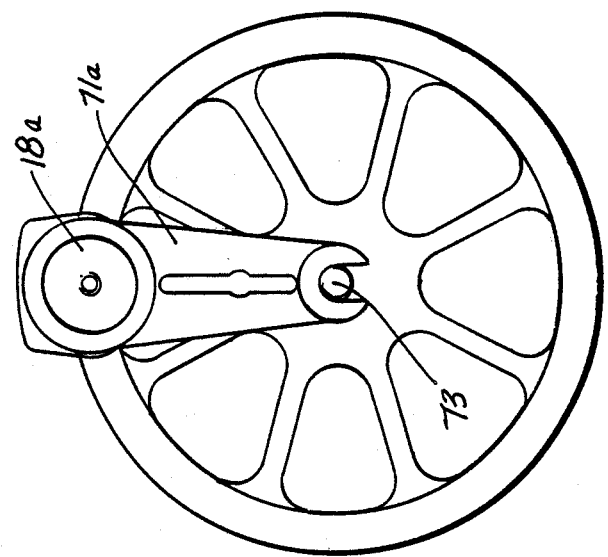
Figure 12:
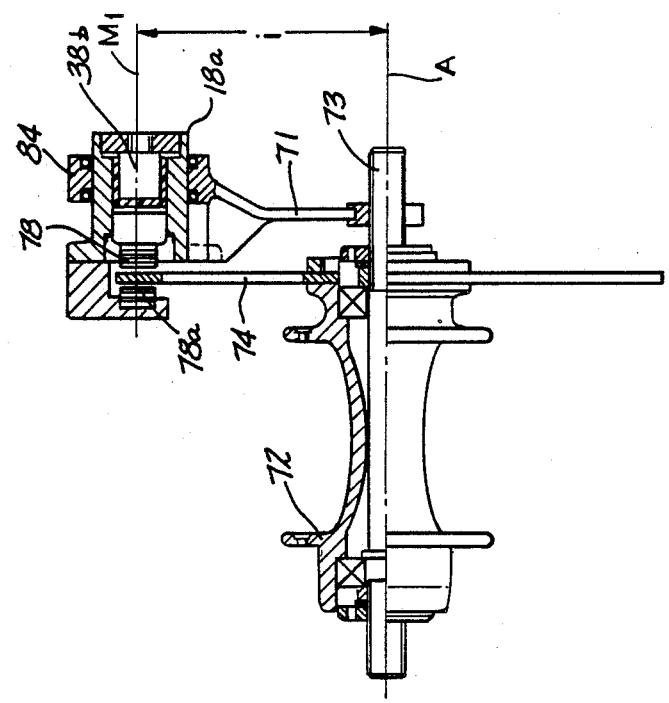

In the embodiment shown in FIGS. 11 and 12 the holding arm 71a is shown without a bolt mounting and accommodates the housing 18a in a frame 84 at a distance i of 65 mm from the shaft A. This holding arm 71a entails the advantage of being easily adjustable.

In addition, it is also foreseen that there be a sliding coupling between the brake disk 74 and the hub 72, to prevent the system from locking up.

What is claimed is:

1. A bicycle brake system which comprises: at least one master cylinder; a hand lever connected to said master cylinder; at least one wheel cylinder connected to said master cylinder; a hydraulic brake line connecting said wheel cylinder to said master cylinder; a space of variable volume opening out from both ends of said brake line adjacent the master cylinder and the wheel cylinder, respectively; a piston and spring means supported thereby operatively associated with the variable volume space of the master cylinder, with said piston in sliding engagement with the master cylinder, wherein said piston is configured as a disk piston with an annular groove for an O-ring; an O-ring in said annular groove in sliding engagement with said master cylinder; a push rod operated by said hand lever; an elastic plastic thimble having an interior space and secured in the master cylinder and closed at one end by a closed face, wherein the interior space accommodates said push rod and wherein said closed face abuts said piston and wherein said piston and push rod are on opposite sides of said closed face; whereby said hand lever, push rod, thimble, piston and spring means cooperate to reduce the volume of the variable volume space of the master cylinder; an elastic plastic thimble secured to the space of variable volume of the wheel cylinder, said wheel cylinder thimble having an interior space connected to the brake line and closed at one end by a closed face, brake pads operatively associated with said closed face, whereby the closed face applies a braking force on the brake pads.

2. A bicycle brake as defined in claim 1 wherein the thimbles of the master cylinder and the wheel cylinder are formed as hollow cylinders with a radial collar at the open end of the cylinders.

3. A bicycle brake as defined in claim 1 including a cylinder housing of the master cylinder, wherein the thimble of the master cylinder is secured with its radial collar between an annular shoulder of the cylinder housing on the one side and a clamping ring on the other.

4. A bicycle brake as defined in claim 3 wherein said spring means is a coil spring and wherein said coil spring extends between the piston and said shoulder-like part of the cylinder housing.

5. A bicycle brake as defined in claim 1 including a cylinder housing of the wheel cylinder, wherein the thimble of the wheel cylinder is secured with its radial collar between an annular shoulder of the cylinder housing on the one side and a screw nipple on the other.

6. A bicycle brake as defined in claim 1 including a hollow piston rod and coil spring means supported thereby operatively associated with the variable volume space of the wheel cylinder, wherein the coil spring means of the wheel cylinder surrounds said hollow piston rod, said hollow piston rod having an inside conical surface receiving a conical pin of the brake pad.

7. A bicycle brake as defined in claim 1 including a bicycle frame wherein the wheel cylinder is axially adjustable in a cylinder holder that is radial thereto, wherein the cylinder holder is pivotally connected to the bicycle frame.

8. A bicycle brake as defined in claim 7 wherein the angle of pivot (w) is approximately 60° in an approximately vertical plane.

9. A bicycle brake as defined in claim 1 wherein the wheel cylinder is supported in a rotatable eccentric disk and its axis is parallel to the axis of said disk.

10. A bicycle brake as defined in claim 9 wherein the eccentric disk is supported so as to be fixable in a U-shaped holder and extends approximately parallel to the adjacent wheel.

11. A bicycle brake as defined in claim 1 wherein the thimble of the wheel cylinder is associated with a brake pad of a disk brake, said brake pad acting at right angles to the plane of the disk close to the edge of said disk.

12. A bicycle brake as defined in claim 11 wherein the brake pad is part of a floating pair of brake pads between which the brake disk passes.

13. A bicycle brake as defined in claim 11 wherein the wheel cylinder is attached to an arm-like holder and this is connected rigidly to an axle pin.

14. A bicycle brake as defined in claim 11 including a wheel hub, wherein between the wheel hub and the brake disk there is a slip coupling.

* * * * *